United States Patent
Aoki

(10) Patent No.: US 11,747,173 B2
(45) Date of Patent: Sep. 5, 2023

(54) SCALE AND MANUFACTURING METHOD OF THE SAME

(71) Applicant: MITUTOYO CORPORATION, Kanagawa (JP)

(72) Inventor: Toshihiko Aoki, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/668,055

(22) Filed: Feb. 9, 2022

(65) Prior Publication Data
US 2022/0268601 A1   Aug. 25, 2022

(30) Foreign Application Priority Data

Feb. 16, 2021 (JP) .................................. 2021-022674
Jan. 19, 2022 (JP) .................................. 2022-006327

(51) Int. Cl.
*G01D 5/20* (2006.01)

(52) U.S. Cl.
CPC ...................................... *G01D 5/20* (2013.01)

(58) Field of Classification Search
CPC ...... G01D 5/20; G01D 5/245; G01D 5/24438; G01D 2205/80; G01D 5/244
See application file for complete search history.

(56) References Cited

U.S. PATENT DOCUMENTS

| | | | | |
|---|---|---|---|---|
| 7,358,724 | B2* | 4/2008 | Taylor | G01R 15/207 |
| | | | | 324/260 |
| 2007/0031705 | A1* | 2/2007 | Hattori | G11B 5/736 |
| | | | | 427/127 |
| 2012/0266478 | A1 | 10/2012 | Frank et al. | |
| 2013/0222198 | A1* | 8/2013 | Kojima | H01Q 1/22 |
| | | | | 343/788 |
| 2016/0054151 | A1 | 2/2016 | Nozawa | |
| 2017/0227380 | A1* | 8/2017 | Musha | G01D 5/2006 |
| 2017/0303405 | A1* | 10/2017 | Fukuchi | H05K 3/022 |
| 2022/0206087 | A1* | 6/2022 | Endo | G01R 33/063 |

FOREIGN PATENT DOCUMENTS

| | | |
|---|---|---|
| JP | 2004-294225 | 10/2004 |
| JP | 3128628 | 1/2007 |
| JP | 3136959 | 11/2007 |
| JP | 2012-225912 | 11/2012 |
| JP | 2016-044967 | 4/2016 |
| JP | 6172898 | 8/2017 |

\* cited by examiner

*Primary Examiner* — Akm Zakaria
(74) *Attorney, Agent, or Firm* — Rankin, Hill & Clark LLP

(57) ABSTRACT

A scale includes a base material, an intermediate layer of soft magnetic material formed on one surface of the base material and roughened on face thereof opposite to the base material, and a scale pattern of a conductor formed on the intermediate layer.

10 Claims, 8 Drawing Sheets

SCALE AND MANUFACTURING METHOD OF THE SAME

CROSS-REFERENCE TO RELATED APPLICATION

This application is based upon and claims the benefit of priority of the prior Japanese Patent Application No. 2021-022674, filed on Feb. 16, 2021 and the prior Japanese Patent Application No. 2022-006327, filed on Jan. 19, 2022, the entire contents of which are incorporated herein by reference.

FIELD

A certain aspect of embodiments described herein relates to a scale and a manufacturing method of the scale.

BACKGROUND

There is disclosed a scale used for electromagnetic induction encodes (for example, see Japanese Patent Application Publication No. 2004-294225).

SUMMARY

In one aspect of the present invention, it is an object to provide a scale and a manufacturing method that are capable of suppressing increasing in size and improving a signal detection accuracy.

According to an aspect of the present invention, there is provided a scale including: a scale including: a base material; an intermediate layer of soft magnetic material formed on one surface of the base material and roughened on face thereof opposite to the base material; and a scale pattern of a conductor formed on the intermediate layer.

According to another aspect of the present invention, there is provided a manufacturing method of a scale including: preparing an intermediate body in which an intermediate layer of a soft magnetic material having a roughened surface opposite to a base material is formed on one surface of the base material, and a conductor layer is provided on the intermediate layer; and forming a scale pattern by forming a patterning of the conductor layer.

According to another aspect of the present invention, there is provided a manufacturing method of a scale including: preparing an intermediate body in which an intermediate layer of a soft magnetic material and a conductor are laminated on a base material in this order; forming a scale pattern by forming a patterning of the conductor layer; and roughening an exposed portion of the intermediate layer.

DESCRIPTION OF EMBODIMENTS

The scale used in the electromagnetic induction encoder has a scale pattern of a conductor that generates an eddy current from the magnetic flux generated by the detector. As the base material of the scale, a steel tape, a glass epoxy substrate, or the like is used. When a conductive base material is used, the detection signal is reduced due to the eddy current loss caused by the base material. Even when a non-conductive base material such as glass epoxy is used, the generated magnetic flux passes through the base material, and if the mounting surface has conductivity, eddy current loss occurs there. Furthermore, if the mounting surface is not a uniform material over the entire scale (for example, electrically and magnetically different materials such as metal and air, such as when partially held by a metal material), it is detected by the position of the detector. The signal to be generated becomes uneven, and the accuracy deteriorates.

Therefore, for example, it is conceivable to reduce the influence of the mounting surface by thickening the base material or lining the back surface of the base material with a conductive material. However, the former cannot be miniaturized due to the increase in thickness, and the latter has a problem that the signal itself is attenuated by the backing material.

The following is a description of embodiments, with reference to the accompanying drawings.

Figure 1:
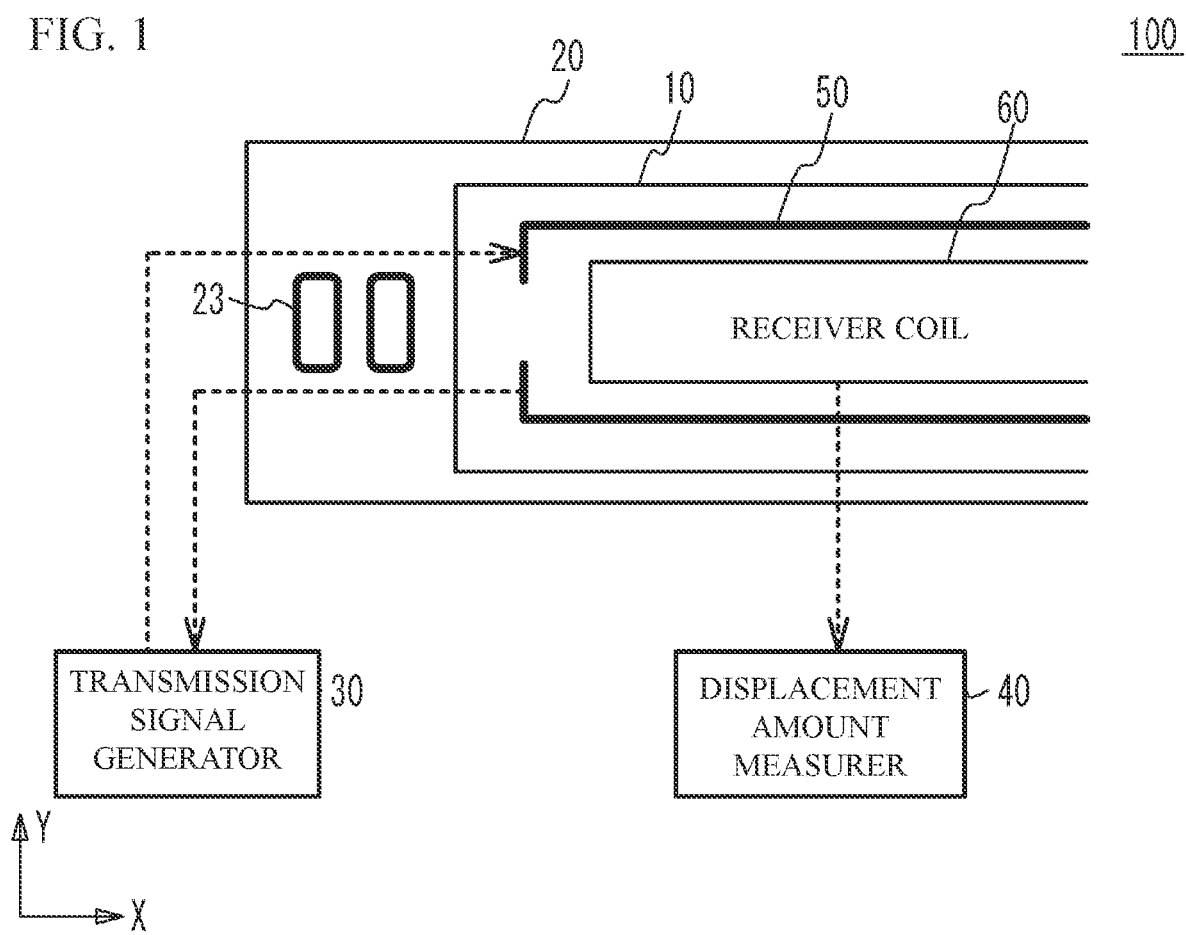
FIG. 1 illustrates a structure of an electromagnetic induction type encoder using electromagnetic connection between a detection head and a scale.

(First embodiment) FIG. 1 illustrates a structure of an electromagnetic induction type encoder 100 using electromagnetic connection between a detection head and a scale. As illustrated in FIG. 1, the electromagnetic induction type encoder 100 has a detection head 10 and a scale 20. The detection head 10 relatively moves in a measurement axis direction with respect to the scale 20. The detection head 10 and the scale 20 have a flat plate shape and face each other through a predetermined gap. The electromagnetic induction type encoder 100 has a transmission signal generator 30 and a displacement amount measurer 40 and so on. In FIG. 1, X-axis indicates a displacement direction of the detection head 10 (measurement axis). Y-axis is vertical to the X-axis in a plane formed by the scale 20.

The detection head 10 has a transceiver coil 50, a receiver coil 60 and so on. The transceiver coil 50 is a rectangular coil of which a longitudinal direction is the X-axis. As illustrated in FIG. 1, the receiver coil 60 is inside of the transceiver coil 50.

In the scale 20, a plurality of scale patterns 23 having a rectangular shape are arrayed in the fundamental period $\lambda$ along the X-axis. Each of the scale patterns 23 is electromagnetically coupled with the transceiver coil 50 and is also electromagnetically coupled with the receiver coil 60.

The transmission signal generator 30 generates a transmission signal of a single phase AC and supplies the generated transmission signal to the transceiver coil 50. In this case, magnetic flux is generated in the transceiver coil 50. Thus, an electromotive current is generated in the plurality of scale patterns 23. The plurality of scale patterns 23 are electromagnetically coupled with the magnetic flux generated by the transceiver coil 50 and generate magnetic flux fluctuating in the X-axis direction in a predetermined spatial period. The magnetic flux generated by the scale patterns 23 generates an electromotive current in the receiver coil 60. The electromagnetic coupling among each coil fluctuates in accordance with the displacement amount of the detection head 10. Thereby, a sine wave signal of the same period as the fundamental period λ is obtained. Therefore, the receiver coil 60 detects a phase of the magnetic flux generated by the plurality of scale patterns 23. The displacement amount measurer 40 can use the sine wave signal as a digital amount of a minimum resolution by electrically interpolating the sine wave signal. Thereby, the displacement amount measurer 40 measures the displacement amount of the detection head 10.

Figure 2:
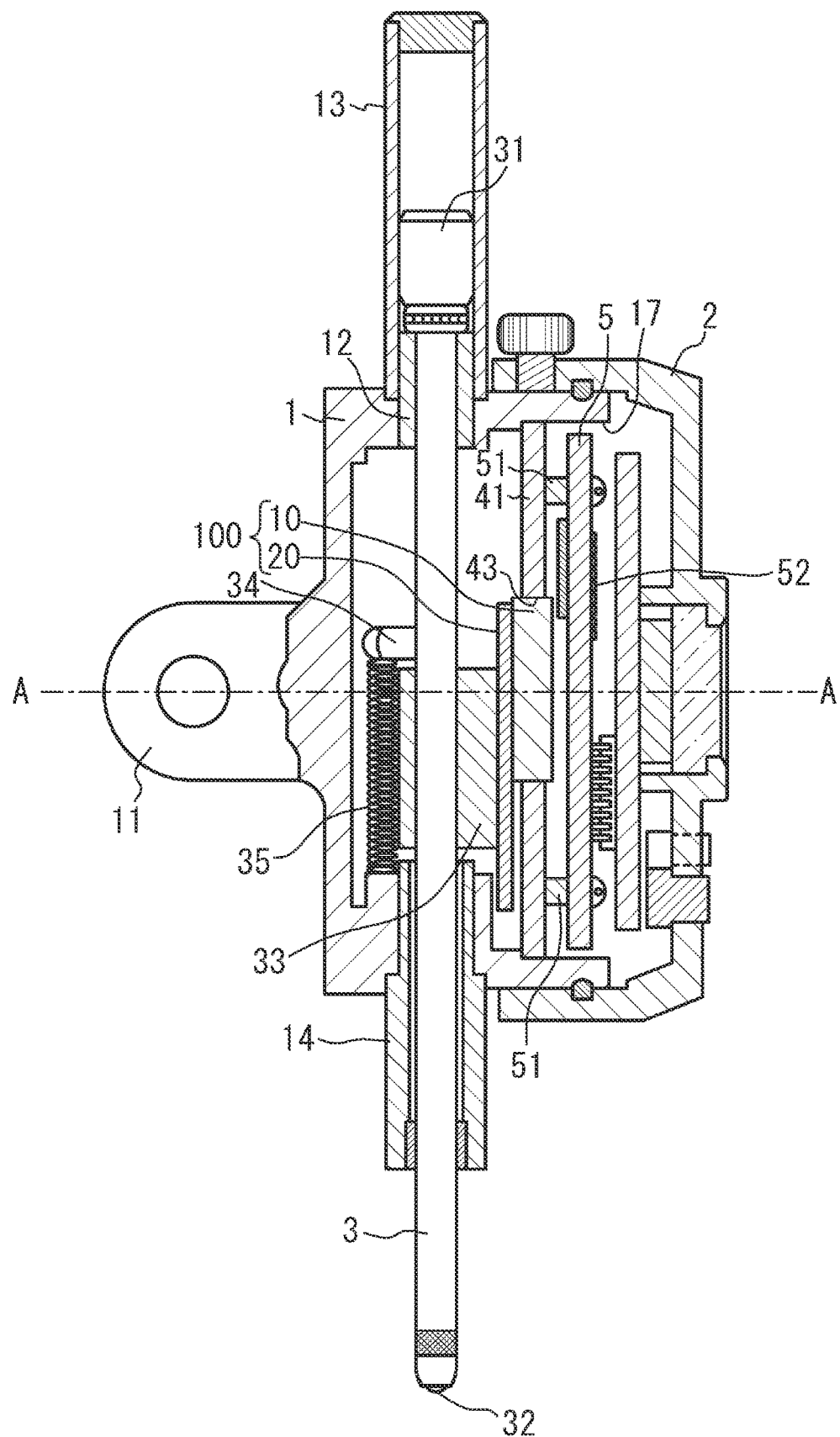
FIG. 2 is a diagram illustrating a structure in which a scale is supported by a support member.

In order to move the scale 20 relative to the measurement axis, the surface (back surface) on which the scale pattern is not formed is supported by a support member. FIG. 2 is a diagram illustrating a structure in which the scale 20 is supported by the support member. As an example, FIG. 2 is a cross-sectional view illustrating an indicator incorporating an electromagnetic induction encoder.

As illustrated in FIG. 2, the indicator has a cylindrical main body case 1 having one end opened, a cylindrical frame body 2 rotatably attached to one end of the main body case 1, a spindle 3 movably supported in the axial direction, and an electromagnetic induction type encoder 100 for detecting an axial displacement amount of the spindle 3.

The main body case 1 is integrally formed with a support collar 11 at substantially the center of the other end surface. A spindle protection cylinder 13 is located on the upper side of the main body case 1 in FIG. 2, that is, the upper part of the outer peripheral wall, via a connecting member 12, and a stem 14 is located on the lower side, that is, the lower part of the outer peripheral wall in FIG. 2. The spindle protection cylinder 13 and the stem 14 are attached to each other on the same axis line. The connecting member 12 and the stem 14 constitute a bearing.

The spindle 3 in which a head portion 31 at the upper end in FIG. 2 is slidably fitted in the spindle protection cylinder 13 is slidably inserted into the stem 14. The spindle 3 is provided with a probe 32 at the lower end protruding from the lower end of the stem 14, and a support member 33 and a spring locking pin 34 are attached to the spindle 3 at a substantially central position located in the main body case 1, respectively. Between the spring locking pin 34 and the inner peripheral wall of the main body case 1, a tension spring 35, which biases the spindle 3 downward in the figure and also regulates the rotation of the spindle 3, is longer than its natural length. It is provided in a state of being pulled so as to be long.

A plate-shaped holding member 41 is fixed to an inner peripheral wall 17 on one opened end side of the main body case 1 by a screw (not illustrated). As illustrated in FIG. 2, the holding member 41 is formed with a notch 43 for holding the detection head 10, which will be described later, in the substantially center.

The electromagnetic induction encoder 100 includes the detection head 10 and the scale 20, and is configured to be able to detect an absolute displacement amount in the axial direction of the spindle 3. The detection head 10 is fitted in the notch 43 of the holding member 41 fixed to the main body case 1 in the vicinity of the spindle 3 and along the axial direction of the spindle 3. The scale 20 is arranged to face the detection head 10 with a predetermined gap, and is fixed to the spindle 3 via the support member 33.

On the front side (right side of FIG. 2) of the holding member 41, a detection side substrate 5 is fixed in parallel with the holding member 41 via a spacer 51. The detection-side substrate 5 is formed in a disk shape along a virtual circular locus centered on the rotation axis A of the frame body 2, which will be described later. A contact pattern 52, which will be described later, is formed on the surface of the detection side substrate 5 on the front side (right side in FIG. 2).

As the base material of the scale 20, for example, a steel tape, a glass epoxy substrate, a glass substrate, or the like is used. When a conductive base material is used, the detection signal is reduced due to the eddy current loss caused by the base material. Even when a non-conductive base material such as glass epoxy or glass is used, the generated magnetic flux passes through the base material, and if the mounting surface has conductivity, eddy current loss occurs there. Furthermore, if the mounting surface is not a uniform material over the entire scale (for example, electrically and magnetically different materials such as metal and air, such as when partially held by a metal material), it is detected by the position of the detector. The signal to be generated becomes uneven, and the accuracy deteriorates.

Therefore, for example, it is conceivable to reduce the influence of the mounting surface by thickening the base material or lining the back surface of the base material with a conductive material. However, the former cannot be miniaturized due to the increase in thickness, and the latter has a problem that the signal itself is attenuated by the backing material.

The scale 20 according to the present embodiment has a configuration capable of improving the signal detection accuracy while suppressing the increase in size. The details of the scale 20 will be described below.

Figure 3A:
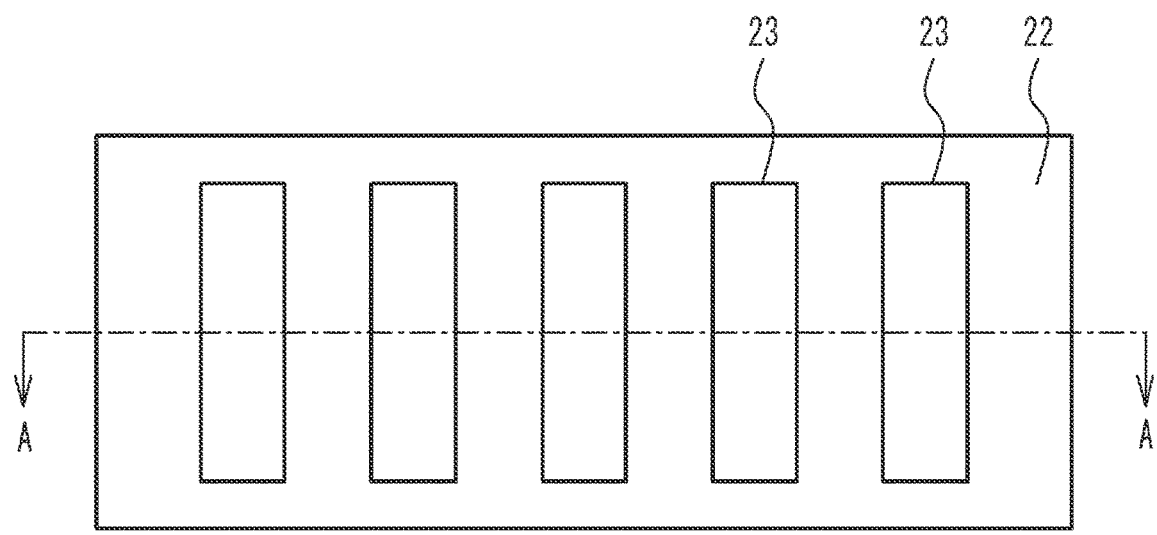
FIG. 3A is a top view of a scale.
Figure 3B:
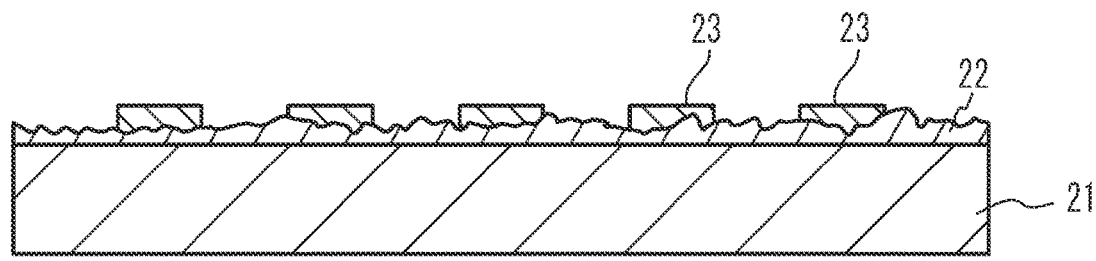
FIG. 3B is a schematic cross-sectional view of a scale.

FIG. 3A is a top view of the scale 20. FIG. 3B is a schematic cross-sectional view of the scale 20. As illustrated in FIGS. 3A and 3B, an intermediate layer 22 is formed on one surface (upper surface) of a base material 21. On the intermediate layer 22, the scale pattern 23 in which metal gratings are arranged at a predetermined interval is formed. The metal gratings are spaced from each other. The intermediate layer 22 may cover the entire upper surface of the base material 21. The intermediate layer 22 preferably covers at least the entire region where the scale pattern 23 is provided. The intermediate layer 22 is provided between the base material 21 and the metal gratings of the scale pattern 23 so that the base material 21 is not exposed between the metal gratings. The scale pattern 23 may be covered with a protective film or the like, but may be exposed to the atmosphere.

The base material 21 is not particularly limited. The base material 21 is, for example, a self-standing plate made of a material other than metal. For example, metal oxides, organic substances, glass epoxy materials, glass and the like may be used as the base material 21. As the glass, a low expansion coefficient material such as quartz glass (synthetic fused silica) may be used.

The intermediate layer 22 is a soft magnetic material. As the intermediate layer 22, for example, iron, permalloy, silicon steel, sendust, soft ferrite, amorphous soft magnetic material, nanocrystalline soft magnetic material and the like can be used. The surface of the intermediate layer 22 opposite to the base material 21 is roughened.

The scale pattern 23 is made of a conductor such as a non-magnetic metal. As the scale pattern 23, for example, copper, aluminum, gold, silver, palladium, alloys containing them, austenitic stainless steel and the like can be used.

According to the present embodiment, since the scale pattern 23 is a conductor, an eddy current is generated in the scale pattern 23 when a magnetic flux that changes spatially and temporally is applied from the outside. Since the soft magnetic material has a high magnetic permeability, the intermediate layer 22 has a magnetic shielding property that does not allow magnetic flux to pass through. Therefore, leakage of the magnetic flux to the base material 21 can be suppressed. Next, an eddy current is also generated in the intermediate layer 22 which is a soft magnetic material, but since the surface of the intermediate layer 22 is roughened, the eddy current in the intermediate layer 22 becomes small, and the eddy current loss in the intermediate layer 22 becomes small. From the above, even if the scale 20 is not formed thick, leakage of magnetic flux is suppressed, eddy current loss is reduced, and signal detection accuracy is improved.

It is preferable to set a lower limit for the average thickness of the entire intermediate layer 22 from the viewpoint of forming a rough surface. The average thickness of the entire intermediate layer 22 is preferably 0.1 µm or more, more preferably 1 µm or more, and further preferably 2 µm or more.

It is preferable to set an upper limit on the average thickness of the entire intermediate layer 22 from the viewpoint of eddy current loss. The average thickness of the entire intermediate layer 22 is preferably 3 µm or less, more preferably 1 µm or less, and even more preferably 0.5 µm or less.

It is preferable to set a lower limit on the surface roughness Ra on the scale pattern 23 side of the intermediate layer 22 from the viewpoint of reducing the eddy current. The surface roughness Ra on the scale pattern 23 side of the intermediate layer 22 is preferably 10 nm or more, preferably 0.5 µm or more, and further preferably 1 µm or more. The surface roughness Ra is an arithmetic mean roughness.

It is preferable to set an upper limit on the surface roughness Ra on the scale pattern 23 side of the intermediate layer 22 from the viewpoint of grating pattern formation and signal strength gap characteristics. The surface roughness Ra on the scale pattern 23 side of the intermediate layer 22 is preferably 100 µm or less, preferably 50 µm or less, and further preferably 10 µm or less.

The above shows the general upper limit and lower limit, but as a preferable combination, when Cu is used as the metal gratings of the scale pattern 23, the height of the gratings is 8 µm or more and 18 µm or less. When the soft magnetic permalloy is used as the intermediate layer 22, a continuous film having a surface roughness Ra of 0.5 µm or more is required to reduce the influence of the eddy current. It is therefore preferable that the average thickness of the intermediate layer 22 is 1 to 3 µm.

Figure 4A:
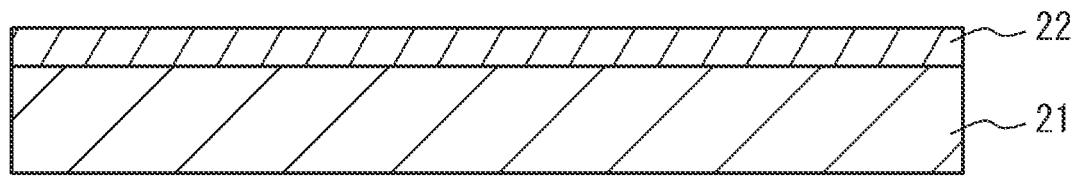
FIG. 4A to FIG. 4D illustrate a flowchart of a manufacturing method of a scale.

FIG. 4A to FIG. 4D are flow charts illustrating a method for manufacturing the scale 20. As illustrated in FIG. 4A, the intermediate layer 22 is formed on the base material 21. The film forming method of the intermediate layer 22 is not particularly limited, and is, for example, vacuum vapor deposition, sputtering, plating, and the like.

Figure 4B:
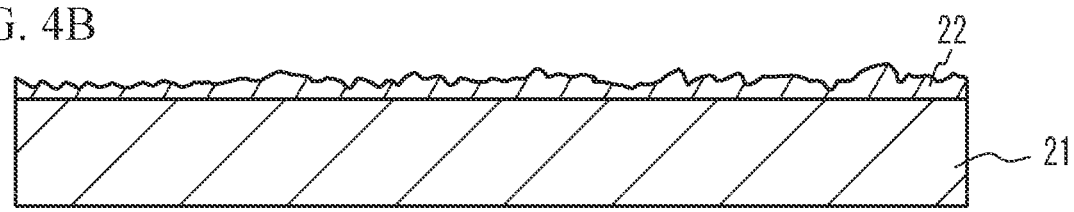

Next, as illustrated in FIG. 4B, the surface of the intermediate layer 22 opposite to the base material 21 is roughened. The roughening method is not particularly limited, and is, for example, wet etching, dry etching, sandblasting, and the like.

Figure 4C:
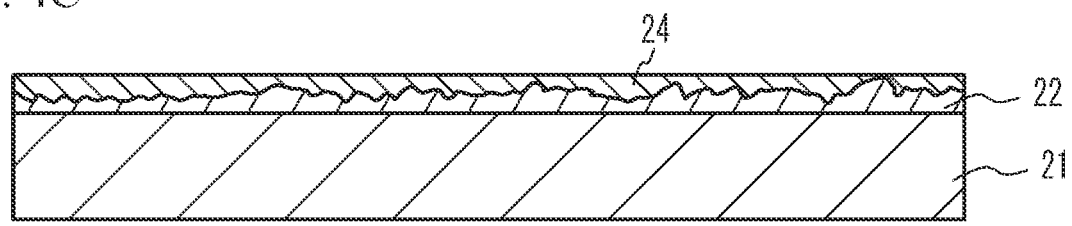

Next, as illustrated in FIG. 4C, a conductor layer 24 is formed on the roughened surface of the intermediate layer 22. The film forming method of the conductor layer 24 is not particularly limited, and examples thereof include plating, vacuum film forming, and pasting of a rolled metal foil sheet.

Figure 4D:
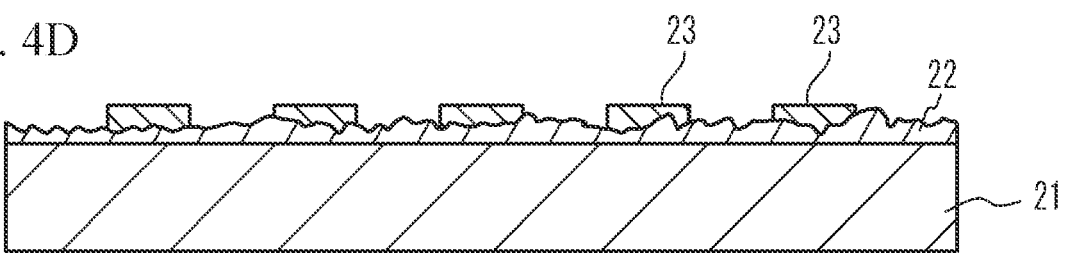

Next, as illustrated in FIG. 4D, the scale pattern 23 is formed from the conductor layer 24 by performing patterning or the like on the conductor layer 24.

(Second Embodiment) Next, a scale 20a according to a second embodiment will be described. The scale 20a can be used in place of the scale 20.

Figure 5A:
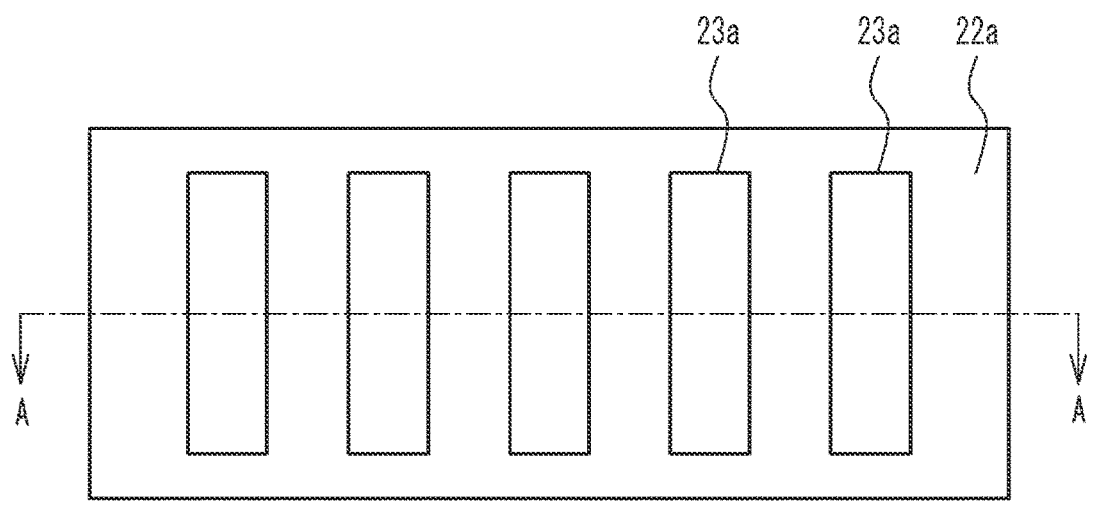
FIG. 5A is a top view of a scale according to a second embodiment.
Figure 5B:
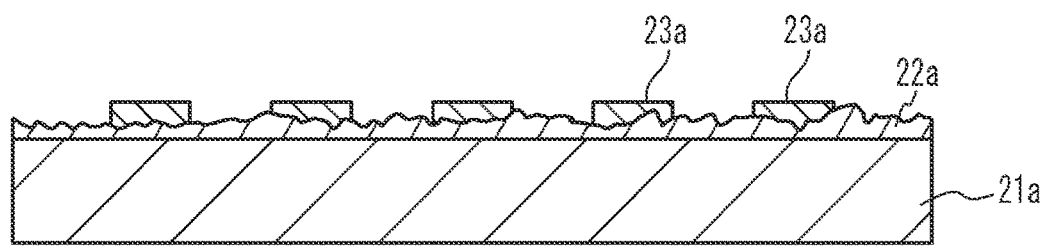
FIG. 5B is a schematic cross-sectional view of a scale.

FIG. 5A is a top view of the scale 20a according to the second embodiment. FIG. 5B is a schematic cross-sectional view of the scale 20a. As illustrated in FIGS. 5A and 5B, an intermediate layer 22a is formed on one surface (upper surface) of a metal tape material 21a as a base material. It has a structure in which a scale pattern 23a in which metal gratings are arranged at a predetermined interval is formed on the intermediate layer 22a. The metal gratings are spaced from each other. The intermediate layer 22a may cover the entire upper surface of the metal tape material 21a. The intermediate layer 22a preferably covers at least the entire region where the scale pattern 23a is provided. The intermediate layer 22a is provided between the metal tape material 21a and the metal gratings of the scale pattern 23a so that the metal tape material 21a is not exposed between the metal gratings. The scale pattern 23a may be covered with a protective film or the like, but may be exposed to the atmosphere.

The metal tape material 21a is not particularly limited. The metal tape material 21a is, for example, a flexible metal film that is not self-standing. The metal tape material 21a is, for example, stainless steel, copper, Inconel, Invar, Super Invar, aluminum, or the like.

The intermediate layer 22a is a soft magnetic material. As the intermediate layer 22a, for example, iron, permalloy, silicon steel, sendust, soft ferrite, amorphous soft magnetic material, nanocrystalline soft magnetic material and the like can be used. The surface of the intermediate layer 22a opposite to the metal tape material 21a is roughened.

The scale pattern 23a is made of a conductor such as a non-magnetic metal. As the scale pattern 23a, for example, copper, aluminum, gold, silver, palladium, alloys containing them, austenitic stainless steel and the like can be used.

According to the present embodiment, since the scale pattern 23a is a conductor, an eddy current is generated in the scale pattern 23a when a magnetic flux that changes spatially and temporally is applied from the outside. Since the soft magnetic material has a high magnetic permeability, the intermediate layer 22a has a magnetic shielding property that does not allow magnetic flux to pass through. Therefore, leakage of the magnetic flux to the metal tape material 21a can be suppressed. Next, an eddy current is also generated in the intermediate layer 22a, which is a soft magnetic material, but since the surface of the intermediate layer 22a is roughened, the eddy current in the intermediate layer 22a becomes small, and the eddy current loss in the intermediate layer 22a becomes small. From the above, even if the scale 20a is not formed thick, leakage of magnetic flux is suppressed, eddy current loss is reduced, and signal detection accuracy is improved.

It is preferable to set a lower limit for the average thickness of the entire intermediate layer 22a from the viewpoint of forming a rough surface. The average thickness of the entire intermediate layer 22a is preferably 0.1 µm or more, more preferably 1 µm or more, and further preferably 2 µm or more.

It is preferable to set an upper limit on the average thickness of the entire intermediate layer 22a from the viewpoint of eddy current loss. The average thickness of the entire intermediate layer 22a is preferably 100 µm or less, more preferably 10 µm or less, and even more preferably 0.5 µm or less.

It is preferable to set a lower limit on the surface roughness Ra on the scale pattern 23a side of the intermediate layer 22a from the viewpoint of reducing the eddy current. The surface roughness Ra on the scale pattern 23a side of the intermediate layer 22a is preferably 10 nm or more, preferably 0.5 µm or more, and further preferably 1 µm or more.

It is preferable to set an upper limit on the surface roughness Ra on the scale pattern 23a side of the intermediate layer 22a from the viewpoint of grating pattern formation and signal strength gap characteristics. The surface roughness Ra on the scale pattern 23a side of the intermediate layer 22a is preferably 100 µm or less, preferably 50 µm or less, and even more preferably 10 µm or less.

The above shows the general upper and lower limits, but as a preferable combination, when Cu is used as the metal gratings of the scale pattern 23a, the height of the gratings is 8 µm or more and 18 µm or less. When soft magnetic permalloy is used as the intermediate layer 22a, a continuous film having a surface roughness Ra of 0.5 µm or more is required to reduce the influence of eddy current, and therefore the average thickness of the intermediate layer 22a is preferably 1 to 3 µm. However, when the intermediate layer 22a is used as the clad material, the average thickness of the intermediate layer 22a is preferably 0.1 mm or less.

Figure 6A:
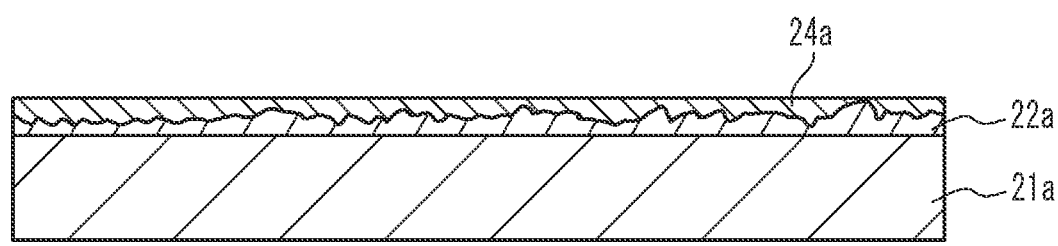
FIG. 6A and FIG. 6B illustrate a flowchart of a manufacturing method of a scale.
Figure 6B:
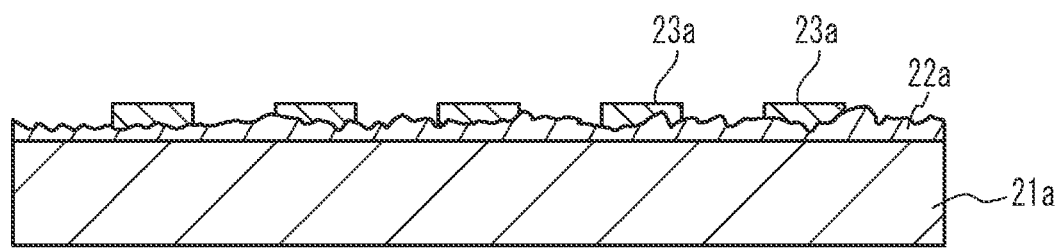

FIGS. 6A and 6B are flow charts illustrating a method for manufacturing the scale 20a. As illustrated in FIG. 6A, a clad material in which the intermediate layer 22a and a conductor layer 24a are laminated in this order on the metal tape material 21a is prepared as an intermediate body. The surface of the intermediate layer 22a opposite to the metal tape material 21a is roughened by wet etching, dry etching, sandblasting, embossing, and the like.

Next, as illustrated in FIG. 6B, the scale pattern 23a is formed from the conductor layer 24a by performing patterning or the like on the conductor layer 24a.

Since the manufacturing method of FIGS. 6A and 6B do not require a vacuum film forming apparatus, it is possible to produce a highly accurate and thin scale at a lower cost.

Figure 7A:
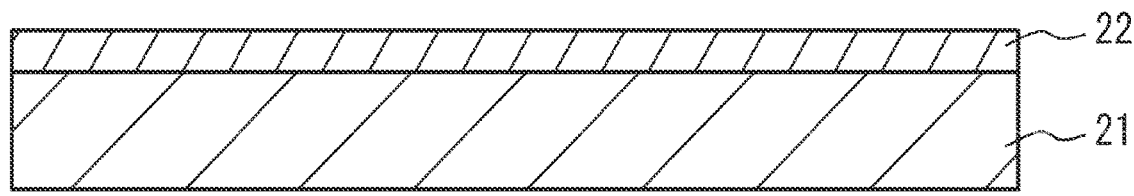
FIG. 7A to FIG. 7C illustrate a flowchart of a manufacturing method of a scale.
Figure 7B:
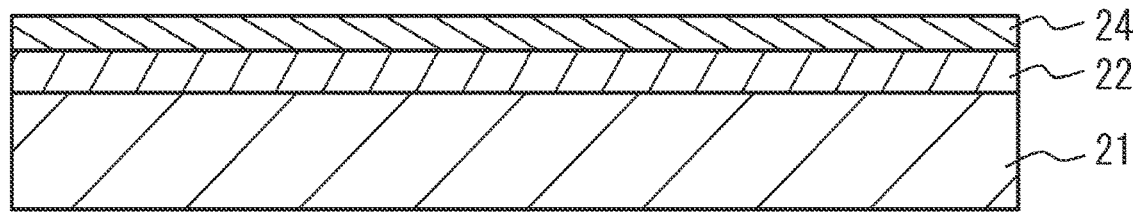
Figure 7C:
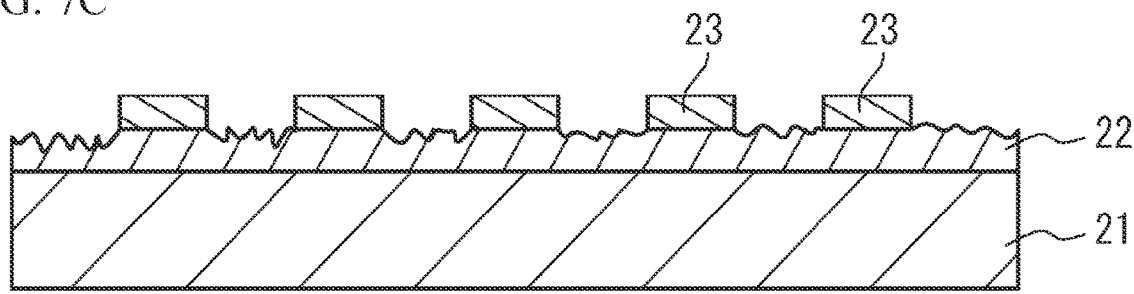

(Modified Embodiment 1) The intermediate layer under the scale pattern does not have to be roughened. FIG. 7A to FIG. 7C are flow charts illustrating another manufacturing method of the scale 20. As illustrated in FIG. 7A, the intermediate layer 22 is formed on the base material 21. The film forming method of the intermediate layer 22 is not particularly limited, and is, for example, vacuum vapor deposition, sputtering, plating, and the like. Next, as illustrated in FIG. 7B, the conductor layer 24 is formed on the intermediate layer 22. The film forming method of the conductor layer 24 is not particularly limited, and examples thereof include plating, vacuum film forming, and pasting of a rolled metal foil sheet. Next, as illustrated in FIG. 7C, the scale pattern 23 is formed from the conductor layer 24 by performing patterning or the like on the conductor layer 24. When forming the scale pattern 23, the exposed portion of the intermediate layer 22 is roughened. The roughening method is not particularly limited, and is, for example, wet etching, dry etching, sandblasting, and the like.

Figure 8A:
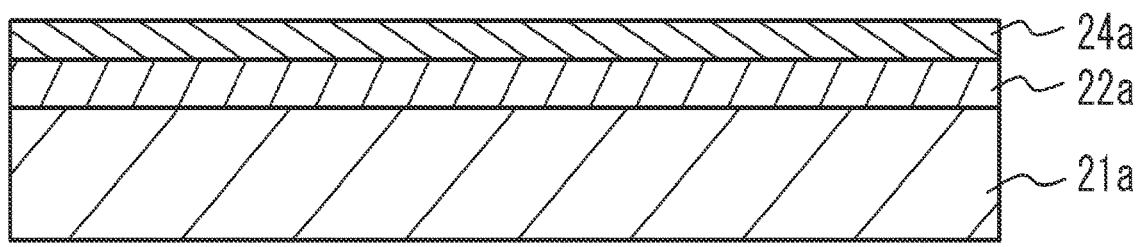
FIG. 8A and FIG. 8B illustrate a flowchart of a manufacturing method of a scale.
Figure 8B:
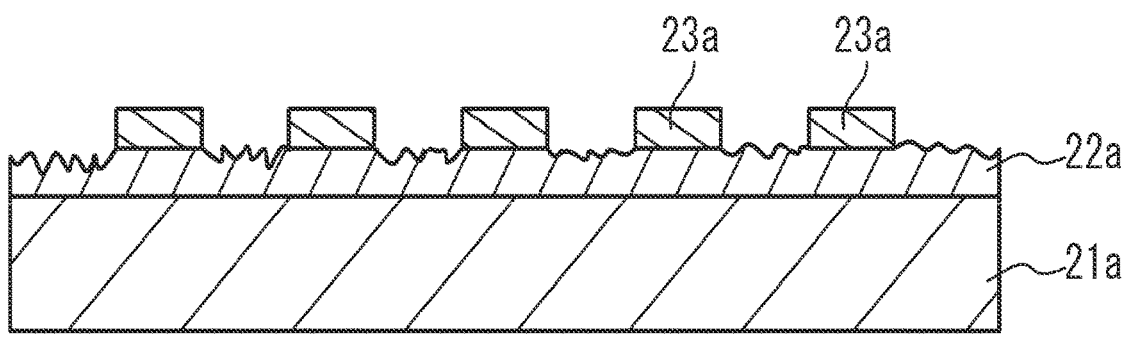

(Modified Embodiment 2) FIG. 8A and FIG. 8B are flow charts illustrating another manufacturing method of the scale 20a. As illustrated in FIG. 8A, a clad material in which the intermediate layer 22a and the conductor layer 24a are laminated in this order on the metal tape material 21a is prepared as an intermediate. Next, as illustrated in FIG. 8B, the scale pattern 23a is formed from the conductor layer 24a by performing patterning or the like on the conductor layer 24a. When forming the scale pattern 23a, the exposed portion of the intermediate layer 22 is roughened. The roughening method is not particularly limited, and is, for example, wet etching, dry etching, sandblasting, and the like.

The present invention is not limited to the specifically disclosed embodiments and variations but may include other embodiments and variations without departing from the scope of the present invention.

What is claimed is:

1. A scale comprising:
   a base material;
   an intermediate layer of soft magnetic material formed on one surface of the base material and roughened on a face thereof opposite to the base material; and
   a plurality of scale patterns of a conductor formed on the roughened face of the intermediate layer,
   wherein the roughened face of the intermediate layer opposite to the base material extends along a direction in which the scale patterns are arrayed at intervals.

2. The scale as claimed in claim 1,
   wherein the base material is a self-standing plate,
   wherein an average thickness of an entire of the intermediate layer is 0.1 µm or more and 3 µm or less,
   wherein a surface roughness average (Ra) of the face opposite to the base material of the intermediate layer is 10 nm or more and 100 µm or less.

3. The scale as claimed in claim 1,
   wherein the base material is a metal tape material,
   wherein the average thickness of an entire of intermediate layer is 0.1 µm or more and 100 µm or less,
   wherein a surface roughness average (Ra) of the face opposite to the base material of the intermediate layer is 10 nm or more and 100 µm or less.

4. The scale as claimed in claim 1, wherein the intermediate layer covers an entire region where the plurality of scale patterns are provided on the one surface of the base material.

5. The scale as claimed in claim 1, wherein the face opposite to the base material of the intermediate layer is roughened in an entire region where the plurality of scale patterns are provided.

6. A manufacturing method of a scale comprising:
   preparing an intermediate body in which an intermediate layer of a soft magnetic material having a roughened surface opposite to a base material is formed on one surface of the base material, and a conductor layer is provided on the intermediate layer; and
   forming a plurality of scale patterns on the roughened surface by forming a patterning of the conductor layer,
   wherein the roughened surface of the intermediate layer extends along a direction in which the scale patterns are arrayed at intervals.

7. The method as claimed in claim 6, further comprising roughening the intermediate layer and forming the conductor layer on the intermediate layer.

8. The method as claimed in claim 6, wherein the intermediate body is prepared by cladding the intermediate layer and the conductor layer on the base material.

9. A manufacturing method of a scale comprising:
   preparing an intermediate body in which an intermediate layer of a soft magnetic material and a conductor are laminated on a base material in this order;
   forming a plurality of scale patterns by forming a patterning of the conductor; and roughening an exposed portion of the intermediate layer, said exposed portion extending along a direction in which the scale patterns are arrayed at intervals.

10. The scale as claimed in claim 1, further comprising:
a detection head that faces the plurality of scale patterns through a predetermined gap and has a transceiver coil and a receiver coil,
wherein the base material has a plate shape, and
wherein the detection head relatively moves with respect to the base material.

* * * * *